United States Patent [19]

Swain

[11] Patent Number: 4,572,358
[45] Date of Patent: Feb. 25, 1986

[54] POWERED TRANSMISSION ASSEMBLY FOR AN ACCUMULATING CONVEYOR

[75] Inventor: Ronald R. Swain, Danville, Ky.

[73] Assignee: Rexnord Inc., Brookfield, Wis.

[21] Appl. No.: 576,993

[22] Filed: Feb. 6, 1984

Related U.S. Application Data

[63] Continuation of Ser. No. 242,493, Mar. 10, 1981, abandoned.

[51] Int. Cl.⁴ .............................................. B65G 13/06
[52] U.S. Cl. ..................................... 198/781; 198/789
[58] Field of Search .................................. 198/781, 789

[56] References Cited

U.S. PATENT DOCUMENTS

| | | | |
|---|---|---|---|
| 4,108,303 | 8/1978 | Vogt et al. | 198/781 |
| 4,238,029 | 12/1980 | Pirro, Jr. | 198/781 |
| 4,278,166 | 7/1981 | Pirro, Jr. | 198/781 |

Primary Examiner—Robert J. Spar
Assistant Examiner—Dennis Williamson
Attorney, Agent, or Firm—William L. Falk

[57] ABSTRACT

An accumulating conveyor having a control diaphragm for moving a roller driving member from a first position in disengagement with one or more conveyor rollers to a second position in driving engagement therewith. The driving member is supported by a flexible flange which is biased in a direction urging the driving member out of contact with the roller or rollers and additionally flexes in response to the control diaphragm.

12 Claims, 7 Drawing Figures

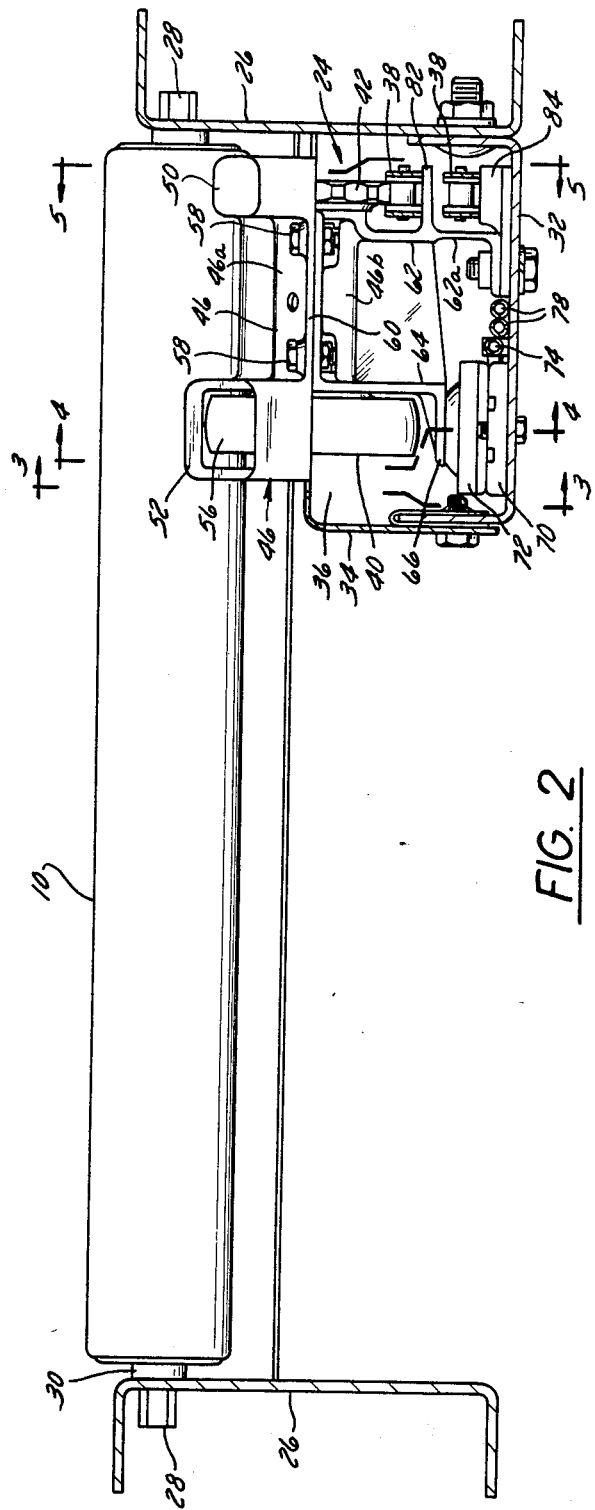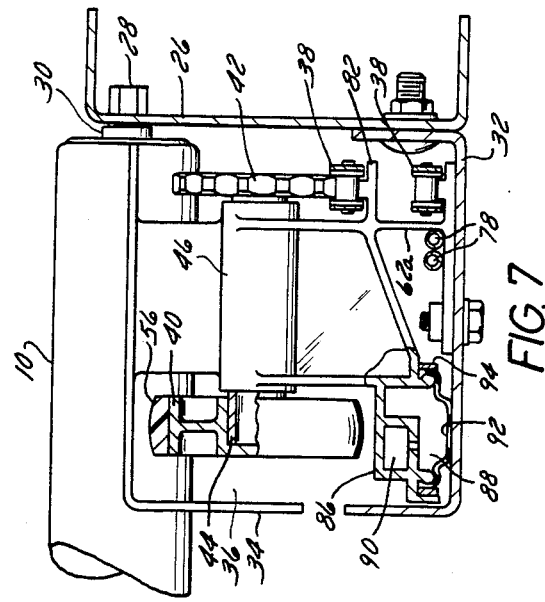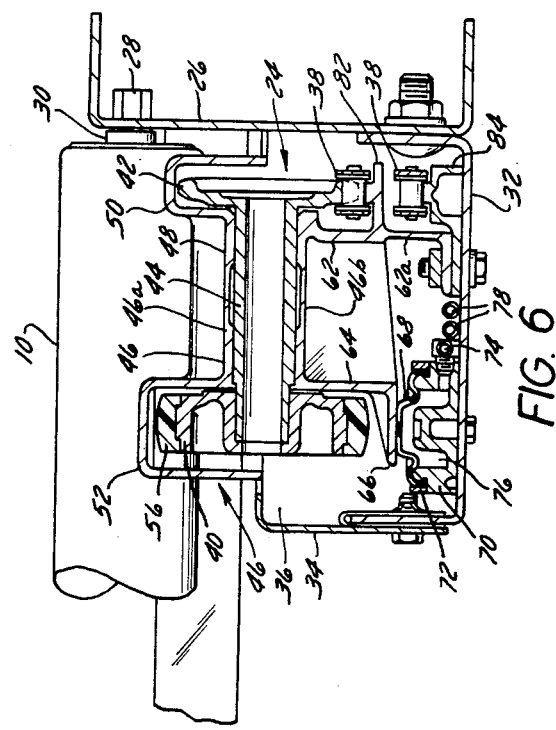

POWERED TRANSMISSION ASSEMBLY FOR AN ACCUMULATING CONVEYOR

This application is a continuation of application Ser. No. 242,493, filed Mar. 10, 1981, now abandoned.

BACKGROUND OF THE INVENTION

This invention relates to conveying apparatus and most particularly to conveying apparatus which employ a multiplicity of rollers for moving objects.

A special version of powered roller conveyors termed accumulating conveyors have wide applications in the material handling industry. For example, accumulating conveyors are employed in circumstances where it is necessary to convey fragile merchandise and is desirable to avoid the buildup of line pressure when for various reasons further movement of the merchandise is impeded. The collective torque of the continuously rotating rollers could result in damage. Accumulating conveyors provide for a reduction in or a cessation of line pressure in selected regions of the conveyor in response to the impediment.

There are various known mechanical devices used to convert powered roller conveyors or zones thereof into accumulating conveyors, examples of which may be found in U.S. Pat. Nos. 3,770,102 and 3,718,248. All of the example devices in the aforementioned patents employ some means of interrupting the drive mechanism from the rollers. U.S. Pat. No. 3,770,102 describes an inflatable tube which raises and lowers support rollers which in turn raise and lower a powered endless belt against the conveyor rollers. Pneumatic devices of this nature in combination with movable rollers are well recognized in the art of which this patent is but an example.

U.S. Pat. No. 3,718,248 sets forth still another mechanical device in which a pivotable wheel connected to a sprocket is pivotable into and out of contact with the roller conveyors. The major benefit of this particular mechanical device is particularly manifested in the modular nature of the drive unit, i.e. drive wheel, sprocket, and connecting shaft. Ease of assembly and removal are the result. A detriment, however, is the need to provide a variety of moving parts, e.g. rotating sleeves and collars, to accomplish the rotation. Such parts are susceptible to wear and, as an obvious drawback, add to the cost of manufacture.

Another example of a pivotable device is disclosed in U.S. Pat. No. 4,108,303. This device also has the benefits associated with a modular unit, however, the weight of the drive chain is raised and lowered together with the pivotable wheel that engages the conveying rollers. This tends to result in excessive wear of the chain guides and other components of the modular unit.

A further drawback associated with known pivotable wheels employed in accumulating conveyors is the relatively high degree of accuracy that must be maintained in aligning the wheel so that two adjacent conveying rollers are driven by the wheel. Misalignment or uneven wear may cause the wheel to engage only one conveying roller.

It is the paramount object of the present invention to preserve the modular concept of a movable drive unit which can couple and uncouple the power source from the rollers yet simplify the mechanical structure such that a pivoting action and commitant elements needed to provide such action are unnecessary.

The present invention comprises a drive unit supported by a flexing member which biases the drive unit out of engagement with the conveyor rollers and a control unit which, upon command, flexes the flexing member and therefore the drive unit into positive engagement with the rollers.

The above will be more readily apparent by a reading of the following detailed description and the appended drawings in which:

FIG. 2 is an end view of a conveyor showing a roller and the drive unit of the present invention;

FIG. 6 is a sectional view taken along lines 6—6 of FIG. 3; and

FIG. 7 is a view similar to FIG. 6 except of a different construction.

DESCRIPTION OF THE PREFERRED EMBODIMENT

Figure 1:
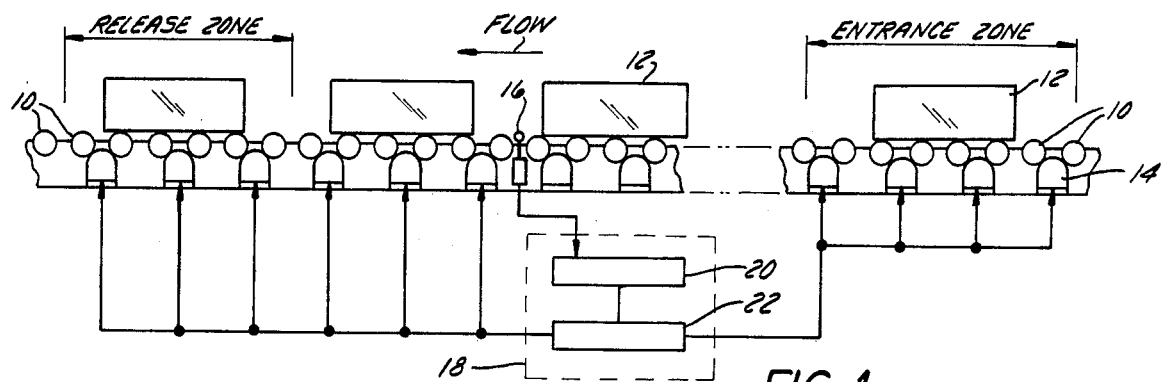
FIG. 1 is a schematic of a typical conveyor apparatus in which the present invention is employed.

The schematic of FIG. 1 illustrates in abbreviated form the environment in which the present invention may operate. The conveying apparatus depicted therein comprises a plurality of rollers 10 defining a surface over which a series of articles 12 can be moved. Driving each pair of rollers 10 are driving members 14. Positioned at predetermined intervals between rollers 10 are sensing rollers 16 or other means which through depression thereof or detection by an article 12 being propelled by the rollers can disengage or uncouple via control system 18 the driving members 14 from other rollers 10 at various predetermined locations or zones in the conveying apparatus. For example, when it is desired that the conveyor apparatus be operated in an accumulating mode, zones which are upstream, i.e. located closer to the entrance zone may be deactivated when the presence of an article is sensed by one or more downstream zones. Thus, when sensing roller 16 is depressed, it activates pressure control 20 which in turn causes pressure source 22 to alter its pressure to drive unit 24, thereby decoupling unit 24 from rollers 10 and deactivating that part of the conveyor.

FIG. 2 illustrates an end view of the conveyor apparatus of the patent invention. The conveyor itself is comprised of the usual elements, namely a pair of parallel rails 26 which form parts of the overall conveyor frame structure. Roller 10 is supported for rotary movement between rails 26 by stationary axle 28 held motionless by virtue of the hexagonal cross-section thereof and complimentary axle support openings in rails 26.

Rollers 10 may be of any conventional structure commonly used in the material handling industry. For example, the rollers may be formed of sheet steel material into a cylindrical shape and fitted, for example, with hub inserts 30 having inner and outer races separated by spherical bearings. The inner race of hubs 30 are held stationary due to complimentary internal fit with axles 28 while the outer race and rollers 10 are free to turn.

Extending beneath rollers 10 and secured by a longitudinal edge to one of the rails 26 is support bracket 32 which runs the longitudinal length of the conveyor. Attached to the other longitudinal edge of support bracket 32 is an enclosure cover 34 which together with support bracket 32 forms an enclosure 36 running the length of the conveyor as perhaps best seen in FIG. 3. The primary purpose of enclosure 36 is to prevent unintentional contact with the various drive elements employed to move the rollers and to prevent entrance of foreign materials which could be detrimental to proper operation of the conveyor.

Positioned within enclosure 36 is drive unit 24 which, as stated above, serves to transmit power from an endless member such as roller chain 38 to rollers 10. Unit 24 comprises a drive wheel 40 connected to a sprocket 42 by a shaft 44. The mounting for wheel 40, shaft 44, and sprocket 42 is split housing 46 formed into upper section 46a and lower section 46b which completely encloses shaft 44 with cylindrical mid-portion 48. Additionally, housing 46 encloses the upper half of sprocket 42 with sprocket cover 50 and substantially the upper half of wheel 40 with wheel cover 52.

Figure 3:
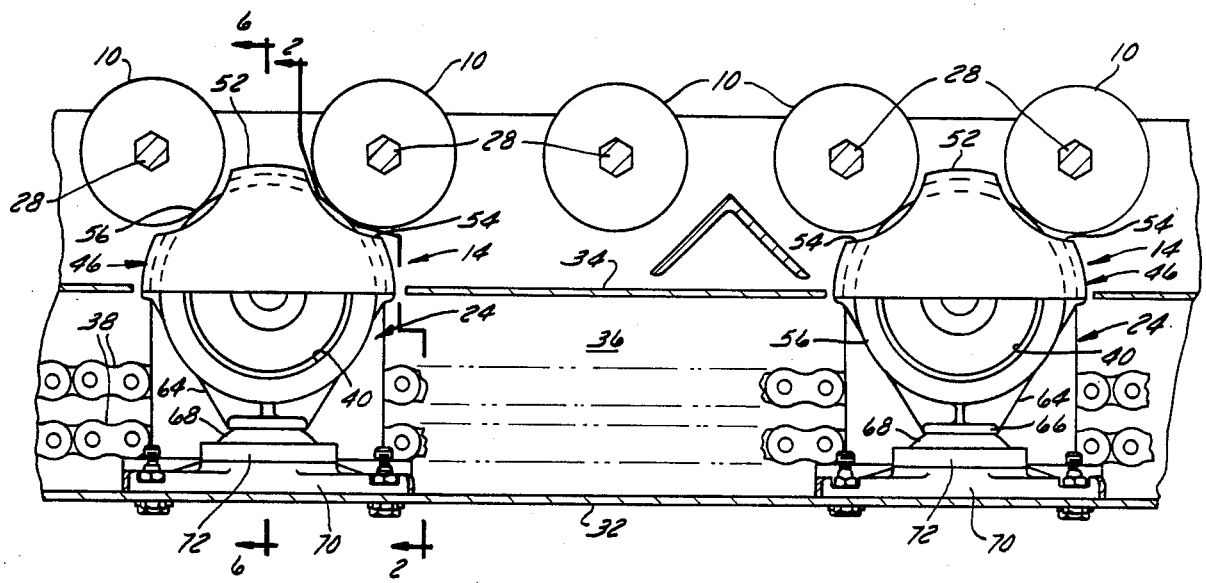
FIG. 3 is a sectional view taken along lines 3—3 of FIG. 2.

As best seen in FIG. 3, wheel 40 is positioned between adjacent rollers 10 so as to simultaneously contact both when in position through openings 54 in wheel cover 52. Additionally, wheel 40 may be provided a rim 56 which will facilitate frictional contact with rollers 10.

Preferably wheel 40, shaft 44, and sprocket 42 may be one unitary piece, as for example, an injection molded thermoplastic piece. Alternatively, each element could be formed separate out of various plastics and/or metallic materials with wheel 40 and sprocket 42 being keyed to shaft 44.

The halves of housing 46 may be bolted together by bolts 58 along complementary flanges 60 which extend horizontally outward along both sides of split central portion 48. This can best be viewed in FIG. 2. The split housing 46 can provide access to drive unit 24 if any or all of the elements 40, 42, 44 need to be replaced and to facilitate assembly. Housing 46 provides additional protection against egress of foreign substances which could interfere with the proper function of the apparatus.

Figure 4:
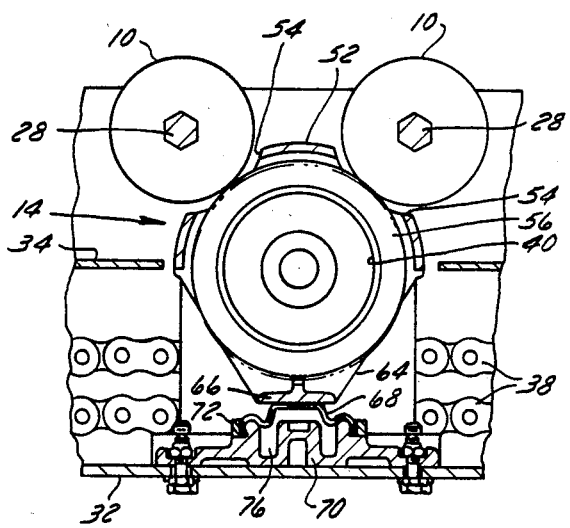
FIG. 4 is a sectional view taken along lines 4—4 of FIG. 2.
Figure 5:
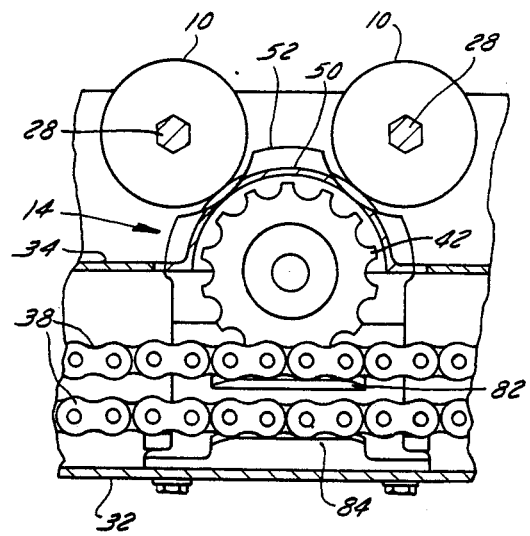
FIG. 5 is a sectional view taken along lines 5—5 of FIG. 2.

Support for drive unit 24 is provided by a pair of vertical legs 62, 64 integral with and extending downward from lower housing section 46b. Leg 62 is secured to support bracket 32 by the flex member 62a while leg 64 terminates in a horizontal flange 66 which itself is positioned substantially beneath wheel 40 and is biased against a diaphragm 68. As perhaps best seen in FIG. 4, leg 62 takes the form of a wedge which converges to its junction with flange 66.

As should now be readily evident, flange 66 is capable of movement with diaphragm 68. It is important that flange 66 be biased in the direction of diaphragm 68. While there are various ways that this can be accomplished, the simplest and preferred mode is to pretension or load lower housing 46b to provide a natural tendency for flange 66 to resist any upward movement of diaphragm 68. To facilitate the flexing of housing 46, leg 62 may be provided with a thinned cross-section or other means to provide flexing in the region 62a near where it is fastened to support bracket 32 as is readily evident from FIG. 2.

Diaphragm 68 is secured to diaphragm mount 70 by retaining ring 72. Mount 70 is fastened in an air tight relationship to support bracket 32. A passageway 74 communicates with chamber 76 within mount 70. A plurality of air hose fittings 78 are attached to the external mouth of passageway 74 to be appropriately attached to hoses leading to a remote source of air pressure 22 seen in FIG. 1.

As said above, the bias of housing 46 in a manner such as to urge flange 66 to follow diaphragm 68 provides an important additional function. Prior art decoupling mechanisms generally employ gravity to accomplish movement of drive wheels away from the rollers. Obviously, perhaps because of foreign materials, there are times when gravity is ineffective due to sticking or jamming of the pivotable support of the drive wheels. This may result in continuous contact of the drive wheel with its rollers and continuous rotation of the rollers. The present invention does not have this problem.

Diaphragm 68 is preferably of the rolling type of diaphragm and may be composed of any suitable materials such as polyurethane.

Positioned beneath sprocket 42 is the endless member 38, e.g., a strand of roller chain, which is held into contact with sprocket 42 by a guide 82 which extends from leg 62. The return strand of chain 38 guides along the I5 surface of guide 84 secured to support bracket 32. Chain 38 may be driven by a suitable mechanism, the drive of which is not shown and forms no part of the invention herein.

FIG. 7 illustrates another construction of the present invention in which housing 46 is provided with an extension 86 comprising a chamber 88 and an air inlet/exit 90. Diaphragm 92 is held in an airtight relationship to chamber 88 by retaining ring 94. Diaphragm 92, when inflated, presses against support bracket 32.

In operation when the conveyor or a particular zone of a conveyor is in a non-accumulated or live mode, drive wheel 40 is held into contact with adjacent pairs of rollers 10. This is accomplished because diaphragm 68 is inflated and therefore elevates flange 60. Thus the entire housing flexes along its length, particularly in the thinned region 62a. Since thinned region 62a is capable of flexing horizontally to some extent as well as vertically, drive wheel 40 can be considered self-centering between two rollers 10. Accuracy of alignment of the driving housing 46 is therefore less critical than it is in similar known devices. Sprocket 42 being continuously driven by chain 38 causes rollers 10 to rotate. As chamber 76 is evacuated in response to a signal received, for example, from the sensing rollers of several upstream zones (indicating the presence of several articles) diaphragm 68 contracts and, because housing 46 is pretensioned, flange 66 follows diaphragm 68. Wheel 40 is then lowered and spaced away from rollers 10, permitting them to be freely rotating. In this manner, any articles on rollers 10, of the particular zone where wheels 40 are lowered, will cease moving and accumulate.

From a reading of the description and appended drawings, certain other modifications and alterations to the present invention will be evident to those skilled in the art without departing from the metes and bounds of the invention as defined by the following claims:

I claim:

1. An accumulating roller conveyor comprising
   (a) a frame;
   (b) a plurality of rollers which are rotatably supported by said frame and define a load bearing surface along a longitudinal axis of the conveyor;
   (c) a plurality of flexing members having a first portion fixedly secured to said frame and a second movable portion connected to said first portion, said first portion having a thinned region adapted to move in a transverse direction along said rollers and a torsional direction whereby said second movable portion moves in a horizontal direction along the longitudinal axis of the conveyor;

(d) a plurality of driving members rotatably mounted on said flexing members, said flexing members biased in a first position with said respective driving members disengaged from said rollers and flexible in both a substantially vertical direction to move said driving members toward said rollers and a substantially horizontal direction to move said driving members along the longitudinal axis of the conveyor to a second position with said respective driving members engaged with said rollers;

(e) an endless member in driving engagement with said driving members; and (f) control means contacting said second movable portion of said flexing members for flexing said flexing member between said first and second positions in which said driving members are in disengagement with said rollers and drivingly engage said rollers.

2. The conveyor of claim 1 in which each driving member is comprised of a drive wheel for engaging the rollers, a drive element for engaging said endless means, and a shaft connecting said drive wheel to said drive element, said first portion of said flexing member being positioned adjacent said drive element and said second movable portion of said flexing member positioned substantially above said control means.

3. The apparatus of claim 2 in which said control means is secured to said frame and operates against said second movable portion of said flexing member.

4. The apparatus of claim 3 in which said flex member is biased against said control means.

5. The apparatus of claim 4 in which said control means comprises an inflatable diaphragm for flexing said flex means against the bias force.

6. The apparatus of claim 2 in which said control means is secured to said movable portion of said flex member.

7. The apparatus of claim 2 in which part of the vertical of said first portion is thinner than the remainder.

8. The apparatus of claim 1 in which each of said flexing members has a central portion supporting its respective driving member, a first leg extending downwardly from one end of the central portion to operate against said control means, said first portion of said flexing member being a second leg extending downward from the other end of the central portion.

9. The apparatus of claim 8 further comprising a means attached to said second leg for guiding said endless member.

10. The apparatus of claim 1 in which each of said driving members is comprised of an integral drive wheel, axle, and sprocket module of thermoplastic material.

11. The apparatus of claim 10 in which each of said flex members has a central housing portion for enclosing and supporting said axle, for enclosing the upper portion of said sprocket, and substantially enclosing the upper portion of drive element.

12. The apparatus of claim 9 in which said guide comprises guide shoes for supporting return and engage portions of said endless member.

* * * * *